(12) United States Patent
Birrer et al.

(10) Patent No.: US 11,204,361 B2
(45) Date of Patent: Dec. 21, 2021

(54) LABORATORY AUTOMATION SYSTEM

(71) Applicant: Roche Diagnostics Operations, Inc., Indianapolis, IN (US)

(72) Inventors: Armin Birrer, Udligenswil (CH); Andreas Drechsler, Baar (CH); Rik Harbers, Cambridge, MA (US)

(73) Assignee: Roche Diagnostics Operations, Inc., Indianapolis, IN (US)

(*) Notice: Subject to any disclaimer, the term of this patent is extended or adjusted under 35 U.S.C. 154(b) by 165 days.

(21) Appl. No.: 15/875,215

(22) Filed: Jan. 19, 2018

(65) Prior Publication Data

US 2018/0224476 A1 Aug. 9, 2018

(30) Foreign Application Priority Data

Feb. 3, 2017 (EP) ..................... 17154631

(51) Int. Cl.
| | |
|---|---|
| *G01N 35/10* | (2006.01) |
| *G01N 21/51* | (2006.01) |
| *G06T 7/60* | (2017.01) |
| *G01N 35/04* | (2006.01) |
| *G06T 7/00* | (2017.01) |
| *G01N 35/00* | (2006.01) |
| *B65G 54/02* | (2006.01) |

(52) U.S. Cl.
CPC ............ *G01N 35/10* (2013.01); *B65G 54/02* (2013.01); *G01N 21/51* (2013.01); *G01N 35/00732* (2013.01); *G01N 35/04* (2013.01); *G06T 7/0012* (2013.01); *G06T 7/60* (2013.01); *G01N 2035/00801* (2013.01); *G01N 2035/00821* (2013.01); *G01N 2035/0401* (2013.01); *G01N 2035/0406* (2013.01); *G01N 2035/0493* (2013.01)

(58) Field of Classification Search
None
See application file for complete search history.

(56) References Cited

U.S. PATENT DOCUMENTS

| | | | |
|---|---|---|---|
| 3,273,727 | A | 9/1966 | Rogers et al. |
| 3,653,485 | A | 4/1972 | Donlon |
| 3,901,656 | A | 8/1975 | Durkos et al. |

(Continued)

FOREIGN PATENT DOCUMENTS

| | | |
|---|---|---|
| CN | 201045617 Y | 4/2008 |
| CN | 102109530 A | 6/2011 |

(Continued)

*Primary Examiner* — Kathryn Wright
(74) *Attorney, Agent, or Firm* — Roche Diagnostics Operations, Inc.

(57) ABSTRACT

A laboratory automation system for processing sample containers containing laboratory samples and/or for processing the samples is presented. The laboratory automation system comprises a digital camera configured to take an image of the sample container together with a calibration element. The image comprises image data related to the sample container and image data related to the calibration element. The laboratory automation system also comprises an image processing device configured to determine geometrical properties of the sample container depending on the image data related to the sample container and the image data related to the calibration element.

4 Claims, 2 Drawing Sheets

(56) References Cited

U.S. PATENT DOCUMENTS

| | | |
|---|---|---|
| 4,150,666 A | 4/1979 | Brush |
| 4,395,164 A | 7/1983 | Beltrop et al. |
| 4,544,068 A | 10/1985 | Cohen |
| 4,771,237 A | 9/1988 | Daley |
| 5,120,506 A | 6/1992 | Saito et al. |
| 5,295,570 A | 3/1994 | Grecksch et al. |
| 5,309,049 A | 5/1994 | Kawada et al. |
| 5,457,368 A | 10/1995 | Jacobsen et al. |
| 5,523,131 A | 6/1996 | Isaacs et al. |
| 5,530,345 A | 6/1996 | Murari et al. |
| 5,636,548 A | 6/1997 | Dunn et al. |
| 5,641,054 A | 6/1997 | Mori et al. |
| 5,651,941 A | 7/1997 | Stark et al. |
| 5,720,377 A | 2/1998 | Lapeus et al. |
| 5,735,387 A | 4/1998 | Polaniec et al. |
| 5,788,929 A | 8/1998 | Nesti |
| 6,045,319 A | 4/2000 | Uchida et al. |
| 6,062,398 A | 5/2000 | Thalmayr |
| 6,141,602 A | 10/2000 | Igarashi et al. |
| 6,151,535 A | 11/2000 | Ehlers |
| 6,184,596 B1 | 2/2001 | Ohzeki |
| 6,191,507 B1 | 2/2001 | Peltier et al. |
| 6,206,176 B1 | 3/2001 | Blonigan et al. |
| 6,255,614 B1 | 7/2001 | Yamakawa et al. |
| 6,260,360 B1 | 7/2001 | Wheeler |
| 6,279,728 B1 | 8/2001 | Jung et al. |
| 6,293,750 B1 | 9/2001 | Cohen et al. |
| 6,429,016 B1 | 8/2002 | McNeil |
| 6,444,171 B1 | 9/2002 | Sakazume et al. |
| 6,571,934 B1 | 6/2003 | Thompson et al. |
| 7,028,831 B2 | 4/2006 | Veiner |
| 7,078,082 B2 | 7/2006 | Adams |
| 7,122,158 B2 | 10/2006 | Itoh |
| 7,278,532 B2 | 10/2007 | Martin |
| 7,326,565 B2 | 2/2008 | Kokoi et al. |
| 7,425,305 B2 | 9/2008 | Itoh |
| 7,428,957 B2 | 9/2008 | Schaefer |
| 7,578,383 B2 | 8/2009 | Itoh |
| 7,597,187 B2 | 10/2009 | Bausenwein et al. |
| 7,771,659 B2 | 8/2010 | Ziegler |
| 7,850,914 B2 | 12/2010 | Veiner et al. |
| 7,858,033 B2 | 12/2010 | Itoh |
| 7,875,254 B2 | 1/2011 | Garton et al. |
| 7,939,484 B1 | 5/2011 | Loeffler et al. |
| 8,240,460 B1 | 8/2012 | Bleau et al. |
| 8,281,888 B2 | 10/2012 | Bergmann |
| 8,502,422 B2 | 8/2013 | Lykkegaard |
| 8,796,186 B2 | 8/2014 | Shirazi |
| 8,833,544 B2 | 9/2014 | Stoeckle et al. |
| 9,056,720 B2 | 6/2015 | Van De Loecht et al. |
| 9,097,691 B2 | 8/2015 | Onizawa et al. |
| 9,187,268 B2 | 11/2015 | Denninger et al. |
| 9,211,543 B2 | 12/2015 | Ohga et al. |
| 9,239,335 B2 | 1/2016 | Heise et al. |
| 9,423,410 B2 | 8/2016 | Buehr |
| 9,423,411 B2 | 8/2016 | Riether |
| 9,593,970 B2 | 3/2017 | Sinz |
| 9,598,243 B2 | 3/2017 | Denninger et al. |
| 9,902,572 B2 | 2/2018 | Mahmudimanesh et al. |
| 10,126,317 B2 | 11/2018 | Heise et al. |
| 10,288,634 B2 | 5/2019 | Kaeppeli |
| 10,416,183 B2 | 9/2019 | Hassan |
| 2002/0009391 A1 | 1/2002 | Marquiss et al. |
| 2003/0092185 A1 | 5/2003 | Qureshi et al. |
| 2004/0050836 A1 | 3/2004 | Nesbitt et al. |
| 2004/0084531 A1 | 5/2004 | Itoh |
| 2005/0061622 A1 | 3/2005 | Martin |
| 2005/0109580 A1 | 5/2005 | Thompson |
| 2005/0163354 A1 | 7/2005 | Ziegler |
| 2005/0194333 A1 | 9/2005 | Veiner et al. |
| 2005/0196320 A1 | 9/2005 | Veiner et al. |
| 2005/0226770 A1 | 10/2005 | Allen et al. |
| 2005/0242963 A1 | 11/2005 | Oldham et al. |
| 2005/0247790 A1 | 11/2005 | Itoh |
| 2005/0260101 A1 | 11/2005 | Nauck et al. |
| 2005/0271555 A1 | 12/2005 | Itoh |
| 2006/0000296 A1 | 1/2006 | Salter |
| 2006/0047303 A1 | 3/2006 | Ortiz et al. |
| 2006/0219524 A1 | 10/2006 | Kelly et al. |
| 2007/0116611 A1 | 5/2007 | DeMarco |
| 2007/0134131 A1 | 6/2007 | Watson et al. |
| 2007/0210090 A1 | 9/2007 | Sixt et al. |
| 2007/0248496 A1 | 10/2007 | Bondioli et al. |
| 2007/0276558 A1 | 11/2007 | Kim |
| 2008/0012511 A1 | 1/2008 | Ono |
| 2008/0029368 A1 | 2/2008 | Komori |
| 2008/0056328 A1 | 3/2008 | Rund et al. |
| 2008/0131961 A1 | 6/2008 | Crees et al. |
| 2009/0004732 A1 | 1/2009 | LaBarre et al. |
| 2009/0022625 A1 | 1/2009 | Lee et al. |
| 2009/0081771 A1 | 3/2009 | Breidford et al. |
| 2009/0128139 A1 | 5/2009 | Drenth et al. |
| 2009/0142844 A1 | 6/2009 | Le Comte |
| 2009/0180931 A1 | 7/2009 | Silbert et al. |
| 2009/0322486 A1 | 12/2009 | Gerstel |
| 2010/0000250 A1 | 1/2010 | Sixt |
| 2010/0152895 A1 | 6/2010 | Dai |
| 2010/0175943 A1 | 7/2010 | Bergmann |
| 2010/0186618 A1 | 7/2010 | King et al. |
| 2010/0255529 A1 | 10/2010 | Cocola et al. |
| 2010/0300831 A1 | 12/2010 | Pedrazzini |
| 2010/0312379 A1 | 12/2010 | Pedrazzini |
| 2011/0050213 A1 | 3/2011 | Furukawa |
| 2011/0124038 A1 | 5/2011 | Bishop et al. |
| 2011/0172128 A1 | 7/2011 | Davies et al. |
| 2011/0186406 A1 | 8/2011 | Kraus et al. |
| 2011/0200239 A1 | 8/2011 | Levine et al. |
| 2011/0287447 A1 | 11/2011 | Norderhaug et al. |
| 2012/0037696 A1 | 2/2012 | Lavi |
| 2012/0129673 A1 | 5/2012 | Fukugaki et al. |
| 2012/0178170 A1 | 7/2012 | Van Praet |
| 2012/0211645 A1 | 8/2012 | Tullo et al. |
| 2012/0275885 A1 | 11/2012 | Furrer et al. |
| 2012/0282683 A1 | 11/2012 | Mototsu |
| 2012/0295358 A1 | 11/2012 | Ariff et al. |
| 2012/0310401 A1 | 12/2012 | Shah |
| 2013/0034410 A1 | 2/2013 | Heise et al. |
| 2013/0126302 A1 | 5/2013 | Johns et al. |
| 2013/0153677 A1 | 6/2013 | Leen et al. |
| 2013/0180824 A1 | 7/2013 | Kleinikkink et al. |
| 2013/0263622 A1 | 10/2013 | Mullen et al. |
| 2013/0322992 A1 | 12/2013 | Pedrazzini |
| 2014/0141465 A1* | 5/2014 | Furrer ............ G01N 35/00732 435/29 |
| 2014/0170023 A1 | 6/2014 | Saito et al. |
| 2014/0234065 A1 | 8/2014 | Heise et al. |
| 2014/0234949 A1 | 8/2014 | Wasson et al. |
| 2014/0234978 A1* | 8/2014 | Heise ................ B65G 54/02 436/48 |
| 2015/0014125 A1 | 1/2015 | Hecht |
| 2015/0140668 A1 | 5/2015 | Mellars et al. |
| 2015/0166265 A1 | 6/2015 | Pollack et al. |
| 2015/0241457 A1 | 8/2015 | Miller |
| 2015/0273468 A1 | 10/2015 | Croquette et al. |
| 2015/0273691 A1 | 10/2015 | Pollack |
| 2015/0276775 A1 | 10/2015 | Mellars et al. |
| 2015/0276776 A1 | 10/2015 | Riether |
| 2015/0276777 A1 | 10/2015 | Riether et al. |
| 2015/0276778 A1 | 10/2015 | Riether et al. |
| 2015/0276781 A1 | 10/2015 | Riether et al. |
| 2015/0276782 A1 | 10/2015 | Riether |
| 2015/0360876 A1 | 12/2015 | Sinz |
| 2015/0360878 A1 | 12/2015 | Denninger et al. |
| 2016/0003859 A1 | 1/2016 | Wenczel et al. |
| 2016/0025756 A1 | 1/2016 | Pollack et al. |
| 2016/0054341 A1 | 2/2016 | Edelmann |
| 2016/0054344 A1 | 2/2016 | Heise et al. |
| 2016/0069715 A1 | 3/2016 | Sinz |
| 2016/0077120 A1 | 3/2016 | Riether |
| 2016/0097786 A1 | 4/2016 | Malinowski et al. |
| 2016/0202854 A1* | 7/2016 | Minato ................ G06F 40/177 715/773 |
| 2016/0229565 A1 | 8/2016 | Margner |
| 2016/0274137 A1 | 9/2016 | Baer |

(56) References Cited

U.S. PATENT DOCUMENTS

| | | |
|---|---|---|
| 2016/0282378 A1 | 9/2016 | Malinowski et al. |
| 2016/0341750 A1 | 11/2016 | Sinz et al. |
| 2016/0341751 A1 | 11/2016 | Huber et al. |
| 2017/0059599 A1 | 3/2017 | Riether |
| 2017/0097372 A1 | 4/2017 | Heise et al. |
| 2017/0101277 A1 | 4/2017 | Malinowski |
| 2017/0108522 A1 | 4/2017 | Baer |
| 2017/0131307 A1 | 5/2017 | Pedain |
| 2017/0131309 A1 | 5/2017 | Pedain |
| 2017/0131310 A1 | 5/2017 | Volz et al. |
| 2017/0138971 A1 | 5/2017 | Heise et al. |
| 2017/0160299 A1 | 6/2017 | Schneider et al. |
| 2017/0168079 A1 | 6/2017 | Sinz |
| 2017/0174448 A1 | 6/2017 | Sinz |
| 2017/0184622 A1 | 6/2017 | Sinz et al. |
| 2017/0248623 A1 | 8/2017 | Kaeppeli et al. |
| 2017/0248624 A1 | 8/2017 | Kaeppeli et al. |
| 2017/0363608 A1 | 12/2017 | Sinz |
| 2018/0067141 A1 | 3/2018 | Mahmudimanesh et al. |
| 2018/0106821 A1 | 4/2018 | Vollenweider et al. |
| 2018/0128848 A1 | 5/2018 | Schneider et al. |
| 2018/0188280 A1 | 7/2018 | Malinowski |
| 2018/0210000 A1 | 7/2018 | Van Mierlo |
| 2018/0210001 A1 | 7/2018 | Reza |
| 2018/0217174 A1 | 8/2018 | Malinowski |
| 2018/0340951 A1 | 11/2018 | Kaeppell |
| 2018/0340952 A1 | 11/2018 | Kaeppeli et al. |
| 2018/0348244 A1 | 12/2018 | Ren |
| 2018/0348245 A1 | 12/2018 | Schneider et al. |
| 2019/0018027 A1 | 1/2019 | Hoehnel |
| 2019/0033209 A1 * | 1/2019 | Kluckner ............ G01N 33/491 |
| 2019/0076845 A1 | 3/2019 | Huber et al. |
| 2019/0076846 A1 | 3/2019 | Durco et al. |
| 2019/0086433 A1 | 3/2019 | Hermann et al. |
| 2019/0094251 A1 | 3/2019 | Malinowski |
| 2019/0094252 A1 | 3/2019 | Waser et al. |
| 2019/0101468 A1 | 4/2019 | Haidar |
| 2019/0285660 A1 | 9/2019 | Kopp et al. |
| 2020/0166405 A1 * | 5/2020 | Wissmann ............ G01J 3/2823 |
| 2020/0200783 A1 | 6/2020 | Durco |
| 2020/0400698 A1 | 12/2020 | Hafner et al. |

FOREIGN PATENT DOCUMENTS

| | | |
|---|---|---|
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0775650 A1 | 5/1997 |
| EP | 0916406 A2 | 5/1999 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2574933 A1 | 4/2013 |
| EP | 2502675 B1 | 2/2014 |
| EP | 2887071 A1 | 6/2015 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-290101 A | 11/1988 |
| JP | 1148966 A | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2006-106008 A | 4/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2013-172009 A | 2/2013 |
| JP | 2013-190400 A | 9/2013 |
| SU | 085591 A1 | 9/1979 |
| WO | 1996036437 A1 | 11/1996 |
| WO | 2003/042048 A3 | 5/2003 |
| WO | 2007/024540 A1 | 3/2007 |
| WO | 2008/133708 A1 | 11/2008 |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2011/138448 A1 | 11/2011 |
| WO | 2012/158520 A1 | 11/2012 |
| WO | 2012/158541 A1 | 11/2012 |
| WO | 2013/152089 A1 | 10/2013 |
| WO | 2013/169778 A1 | 11/2013 |
| WO | 2013/177087 A2 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |
| WO | 2015191702 A1 | 12/2015 |

* cited by examiner

LABORATORY AUTOMATION SYSTEM

CROSS-REFERENCE TO RELATED APPLICATIONS

This application is a continuation of EP 17154631.0, filed Feb. 3, 2017, which is hereby incorporated by reference.

BACKGROUND

The present disclosure generally relates to a laboratory automation system.

A known laboratory automation system comprises an image processing device adapted to determine geometrical properties of a sample container depending on image data related to the sample container. However, such image processing devices typically require a geometry and color calibration to ensure proper functioning.

A typical laboratory sample distribution system being used in a laboratory automation system comprises a number of sample container carriers adapted to carry one or more sample containers, a transport plane adapted to support the sample container carriers, a number of electro-magnetic actuators adapted to move the sample container carriers on top of the transport plane by applying a magnetic force to the sample container carriers, and a control device adapted to control the movement of the sample container carriers on top of the transport plane by driving the electro-magnetic actuators.

However, there is a need for a laboratory automation system having a reliable and cost effective geometry and/or color calibration.

SUMMARY

According to the present disclosure, a laboratory automation system for processing sample containers containing laboratory samples and/or for processing the samples is presented. The laboratory automation system can comprise a digital camera configured to take an image of the sample container together with a calibration element. The image can comprise image data related to the sample container and image data related to the calibration element. The laboratory automation system can also comprise an image processing device configured to determine geometrical properties of the sample container depending on the image data related to the sample container and the image data related to the calibration element.

Accordingly, it is a feature of the embodiments of the present disclosure to provide for a laboratory automation system having a reliable and cost effective geometry and/or color calibration. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
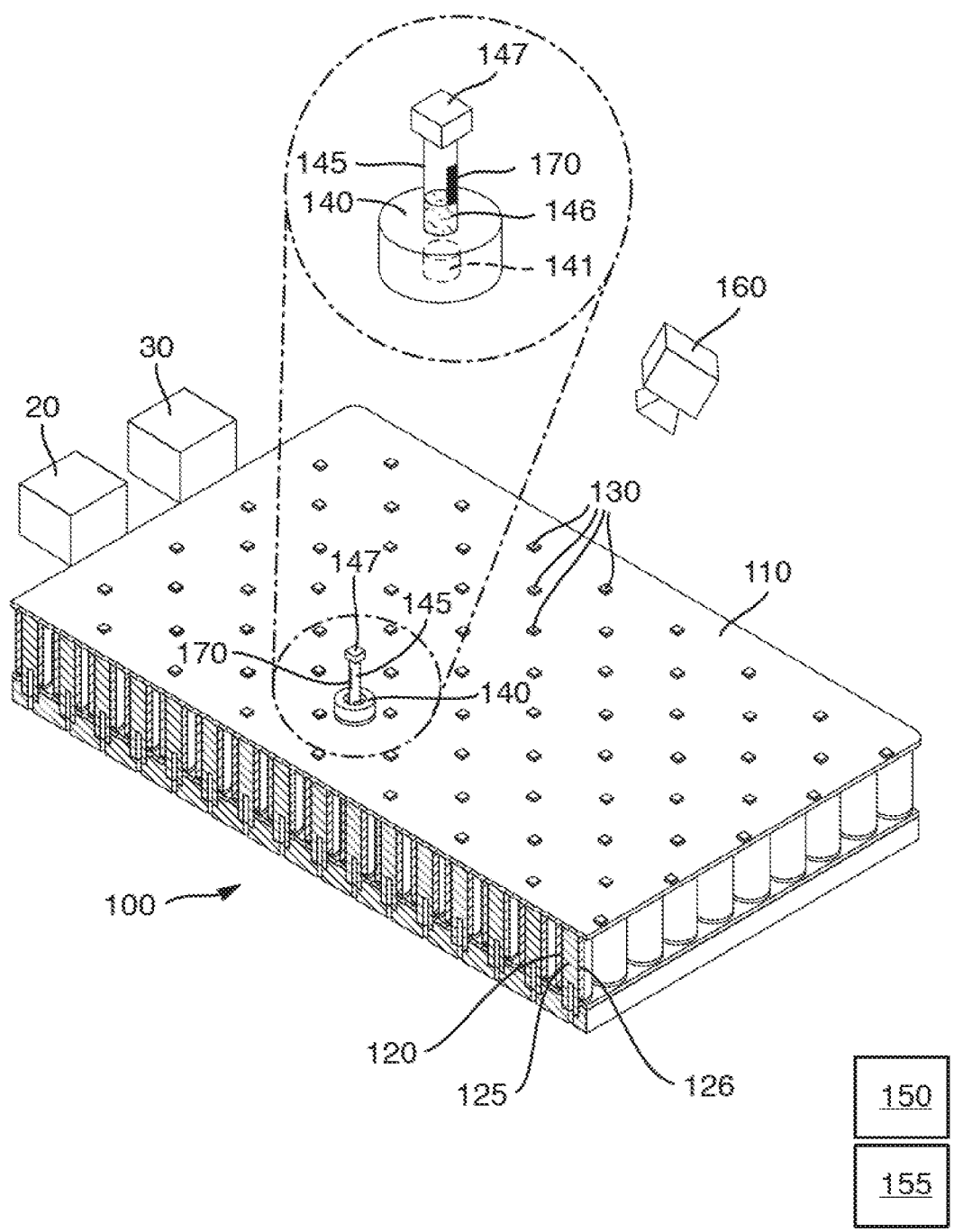
FIG. 1 illustrates schematically a laboratory automation system according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The laboratory automation system can be configured to process sample containers containing laboratory samples and/or to process the samples. Insofar reference is also made to the prior art.

The sample container can typically be designed as a sample tube made of glass or transparent plastic and can typically have an opening at an upper end. The sample container may be used to contain, store and transport the laboratory sample such as a blood sample, (blood) serum or plasma sample, a urine sample, separation gel, cruor (blood cells), a chemical sample or a reagent. The sample container may be rotationally symmetric.

The laboratory automation system can comprise at least one digital grey scale or color camera. The camera can be configured to take a digital image of the sample container and the sample together with a calibration element. The calibration element may be assigned to the sample container. The calibration element may have known geometrical properties. The same digital image can comprise digital image data related to the sample container and/or to the sample and digital image data related to the calibration element.

The laboratory automation system can further comprise an image processing device, e.g. in form of a microprocessor or a personal computer (PC). The image processing device can be configured to determine geometrical properties of the sample container and/or geometrical properties of the sample depending on the image data related to the sample container and/or to the sample and the image data related to the calibration element.

The geometrical properties of the sample container may e.g. be a height or length of the sample container, a diameter of the sample container, a filling level of the sample in the sample container, and the like.

For example, the image processing device may determine the geometrical properties of the sample container and/or geometrical properties of the sample depending on the image data related to the sample container and to the sample and the image data related to the calibration element based on the rule of three. In a first step, the image processing device may determine the pixel data related to sample container and/or related to the sample by pattern recognition. Accordingly, the pixel data related to the calibration element may be determined by pattern recognition. If the sample container and the calibration element are aligned, the image processing device may "count" the pixels along a coordinate for the sample container and may count the pixels for the calibration element along the same coordinate. The geometrical property in this coordinate may then be determined by the rule of three. If, for example, the sample container has a height (z coordinate) of 100 pixels, the calibration element has a height of 10 pixels and the calibration element has a known physical height of 1 cm, the physical height of the sample container may be calculated to 10 cm. Self-evidently, other methods may be used by the image processing device to determine the geometrical properties.

According to an embodiment, the laboratory automation system can comprise a number (e.g. 1 to 10,000) of sample container carriers configured to carry and/or hold and/or store one or more sample containers. At least one of the sample container carriers can form the calibration element or at least one of the sample container carriers can comprise the calibration element. The camera can be configured to take the digital image of the sample container and the sample together with the sample container carrier. According to this embodiment, the sample container carriers can serve as calibration elements. Thus, dedicated calibration elements may be omitted.

According to an embodiment, the calibration element can be a camera detectable sign having defined geometrical properties. The calibration element may e.g. be a circle having a known diameter, a square having a known diagonal, a rectangle having known side lengths, and the like.

According to an embodiment, the sample container can be closed by a cap having known geometrical properties. The calibration element can be formed by the cap. The image processing device can be configured to determine the geometrical properties of the cap. For that purpose, the image processing device may determine a given type of the cap by pattern recognition. After detecting the type, the image processing device may access a database using the determined type, wherein the database stores geometrical properties for types of caps used in the laboratory automation system. Then, the image processing device may determine the geometrical properties of the sample container and/or the geometrical properties of the sample depending from the image data related to the sample container and/or the sample and the geometrical properties of the cap, as e.g. discussed above using the rule of three.

According to an embodiment, the digital camera can be a digital color camera, wherein the calibration element can have known or defined color properties. The image processing device can be configured to calibrate the digital color camera depending on the defined color properties of the calibration element.

According to an embodiment, the laboratory automation system can comprise a transport plane, or transport surface, configured to support or carry the sample container carriers. The transport plane or transport surface may be planar and the sample container carriers can be placed on top of the transport plane or transport surface. The laboratory automation system can further comprise a driver configured to move the sample container carriers on top of the transport plane. The laboratory automation system can further comprise a control device configured to control the movement of the sample container carriers on top of the transport plane by driving the driver such that the sample container carriers move along corresponding transport paths. The control device may e.g. embodied in form of a PC or a microprocessor based control device. Each sample container carrier may move along a path in response to the correspondingly controlled driver. The paths of the sample container carriers may be individual paths.

According to an embodiment, the driver can be electro-magnetic actuators located below the transport plane and controllable by the control device, wherein the sample container carriers can respectively comprise a magnetically active device for interaction with a magnetic field generated by the electro-magnetic actuators such that a magnetic drive force is applied to the sample container carriers. The magnetically active device may e.g. be a permanent magnet or an electromagnet. A number of electro-magnetic actuators may e.g. be a number in the range of 1 up to 1,000,000. The electro-magnetic actuators may be stationary arranged below the transport plane, e.g. in rows and columns forming a grid. The electro-magnetic actuators may be embodied as coils having a ferromagnetic core. The coils may be configured to generate a magnetic field. The magnetic field generated by the electro-magnetic actuators may penetrate the transport plane. The magnetic field may interact with the magnetic field of the magnetically active devices of the sample container carriers. A magnetic force applied to the sample container carriers may be a result of this field interaction. Due to the magnetic force, the sample container carriers may slide and/or move over the transport plane. Thus, the electro-magnetic actuators can be configured to move the sample container carriers on top of the transport plane by applying the magnetic force to the magnetically active devices of the sample container carriers.

According to an embodiment, the laboratory automation system can further comprise a pipetting station, wherein the pipetting station can be configured to operate in response to the determined geometrical properties of the sample container and/or the determined geometrical properties of the sample. If, for example, the filling level of the sample container is determined as a geometrical property, a pipetting head used by the pipetting station may be inserted into the sample container to a pipetting level which depends on the determined filling level.

According to an embodiment, the laboratory automation system can comprise a number (e.g. 1 to 20) of laboratory stations configured to process the samples comprised in the sample containers.

The laboratory stations may e.g. be pre-analytical, analytical and/or post-analytical stations.

Pre-analytical stations may be configured to perform any kind of pre-processing of samples, sample containers and/or sample container carriers.

Analytical stations may be configured to use a sample or part of the sample and the reagent to generate a measuring signal, the measuring signal indicating if and in which concentration, if any, an analyte exists.

Post-analytical stations may be configured to perform any kind of post-processing of samples, sample containers and/or sample container carriers.

The pre-analytical, analytical and/or post-analytical stations may comprise at least one of a decapping station, a recapping station, an aliquot station, a centrifugation station, an archiving station, a pipetting station, a sorting station, a tube type identification station, a sample quality determining station, an add-on buffer station, a liquid level detection station, and a sealing/desealing station.

Vision systems comprising cameras can be used to detect and identify sample containers and their properties need geometry and color calibration to ensure proper functioning.

As the number of vision units or cameras in one system can be large, this calibration can be as efficient and simple as possible According to an embodiment, for calibration known parts of the object being investigated can be used, e.g. the sample container carrier carrying the sample container to be investigated. The sample container carrier can always be of the same known dimensions. Whether one or two-dimensional calibration is required can depend on the properties of the optical system. Additional or alternatively to the sample container carrier, further objects having known dimensions can be used as calibration elements for calibration. If for instance a cap is recognized by its shape and color, prior knowledge about its size can be used to calibrate/confirm the geometry. Another possibility is using known rack dimensions, such as the rack slits.

For this to work, the field of view of the camera needs to be able to encompass the sample container under test.

The sample container carrier used for calibration can feature markers or controlled barcodes that facilitate calibration. It can also feature a color pattern to allow color calibration.

Spring clamps on the sample container carrier can be used to control the rotation of the tube, wherein colored markers at the end of the spring clamps may be used for calibration.

The present disclosure can be independent of the position of the sample container/sample container carrier assembly, as the calibration element, typically the sample container carrier, can be systematically at the same position relative to the object to be calibrated (the sample container). Thus, no reference sample container may be required, no exact positioning, no dedicated calibration process, no reference images, and the like. The calibration can be done "on the fly", i.e. during an actual measurement. Additionally, the calibration can be system-independent, i.e. will work for any imaging system.

The sample container may also be a reagent carrier, a slide, and the like.

A method of operating a laboratory automation system as described above is also presented. The method may comprise the following steps: taking the image of the sample container together with a calibration element by means of the digital camera, identifying the calibration element in the image data, identifying the sample container in the image data, determining the image data related to the calibration element, determining the image data related to the sample container, and determining geometrical properties of the sample container depending on the image data related to the calibration element and the image data related to the sample container.

Referring initially to FIG. 1, FIG. 1 shows a laboratory automation system 100. The laboratory automation system 100 can comprise a first laboratory station 20 and a second laboratory station 30. The first laboratory station 20 can be a pipetting station.

The laboratory automation system 100 can comprise a transport plane 110. Below the transport plane 110, a plurality of electro-magnetic actuators 120 can be arranged in rows and columns forming a grid. Each electro-magnetic actuator 120 can comprise a respective ferromagnetic core 125 encircled by a coil 126.

A number of position sensors 130, embodied as Hall-sensors, can be distributed over the transport plane 110.

The laboratory automation system 100 can further comprise a plurality of sample container carriers 140. A sample container carrier 140 can carry a respective sample container 145, embodied as laboratory tube. It can be noted that only one laboratory sample container carrier 140 carrying a respective sample container 145 is shown in FIG. 1 for exemplary purposes. A typical laboratory automation system 100 can comprise a plurality of such sample container carriers 140.

Each sample container carrier 140 can comprise a magnetically active device 141 in the form of a permanent magnet. Thus, magnetic fields generated by the electro-magnetic actuators 120 can drive a sample container carrier 140 over the transport plane 110. Furthermore, the magnetic field generated by the permanent magnet 141 of a sample container carrier 140 can be detected by the position sensors 130, so that a feedback regarding the position of a sample container carrier 140 can be obtained.

Both the electro-magnetic actuators 120 and the position sensors 130 can be electrically connected to a control device 150. The control device 150 can drive the electro-magnetic actuators 120 such that the sample container carriers 140 move along corresponding transport paths. It can also determine the position of each sample container carrier 140.

The laboratory stations 20, 30 can be arranged adjacent to the transport plane 110. It can be noted that these two laboratory stations 20, 30 are only shown for exemplary purposes in FIG. 1 and that a typical laboratory automation system 100 can comprise more than two laboratory stations 20, 30.

The laboratory automation system 100 can further comprise a digital color camera 160 and an image processing device 155 functionally coupled to the digital color camera 160.

A calibration element 170 in form of a sticker can be attached to the sample container 145.

Before processing the sample comprised in the sample container 145, the digital camera 160 can take an image of the sample container 145 together with the calibration element 170. The resulting digital image can comprise image data related to the sample container 145 and to the sample 146 and image data related to the calibration element 170.

The image processing device can then determine geometrical properties of the sample container 145 and/or geometrical properties of the sample 146 depending on the image data related to the sample container 145 and to the sample 146 and the image data related to the calibration element 170. The image processing device may e.g. determine a filling level of the sample inside the sample container 145.

Figures 2, 3:
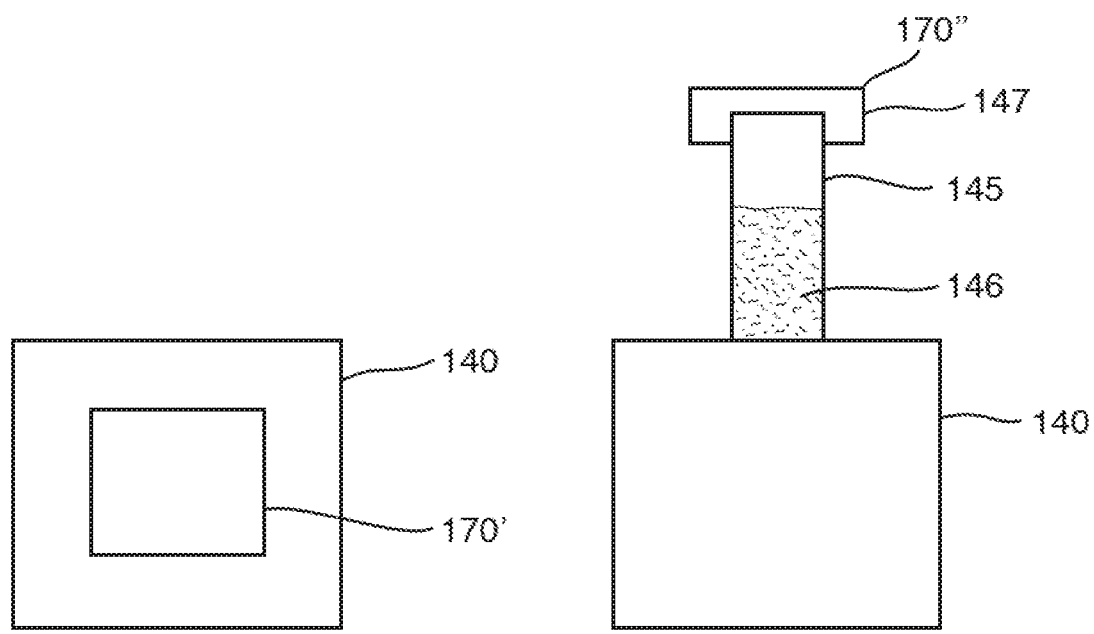
FIG. 2 illustrates schematically a sample container carrier used in the laboratory automation system of FIG. 1 comprising a calibration element according to an embodiment of the present disclosure.
FIG. 3 illustrates schematically s a sample container carrier used in the laboratory automation system of FIG. 1 carrying a sample container closed by a cap serving as a calibration element according to an embodiment of the present disclosure.

FIG. 2 schematically shows a sample container carrier 140 optically marked by a calibration element 170'. The calibration element 170' can be a camera detectable sign having defined geometrical properties such as, for example, a rectangle having known side lengths. The calibration element 170' can have the same function as the calibration element 170 of FIG. 1 and can be used to calibrate the camera 160.

FIG. 3 schematically shows a sample container carrier 140 not marked with the calibration element 170' of FIG. 2. The sample container carrier 140 can carry a sample container 145 closed by a cap 147 serving as a calibration element 170". The calibration element 170" can have the same function as the calibration elements 170 and 170'.

Figure 4:
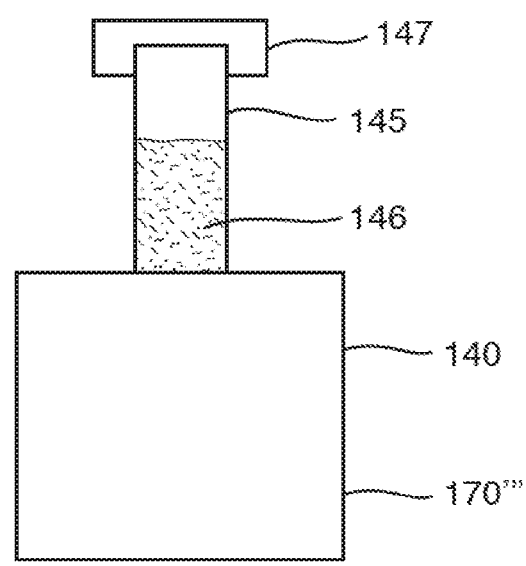
FIG. 4 illustrates schematically a sample container carrier used in the laboratory automation system of FIG. 1 serving as a calibration element according to an embodiment of the present disclosure.

FIG. 4 schematically shows a sample container carrier 140 carrying a sample container 145 closed by a cap 147, wherein the sample container carrier 140 can form a calibration element 170'''. The calibration element 170''' can have the same function as the calibration elements 170, 170' and 170".

The calibration elements 170, 170', 170", 170''' may have defined color properties, wherein the image processing device 155 can be configured to calibrate the digital color camera 160 depending on the defined color properties of the calibration elements 170, 170', 170", 170'''.

The pipetting station 20 can perform the pipetting process in response to the determined filling level of the sample containers 145.

According to the present disclosure, no prior calibration of the camera 160 and of the image processing device 155 may be performed. The image captured of the sample container together with the calibration element 170, 170', 170", 170''' can be used both for calibration and result-generating processing. No reference tubes, reference data or previously stored data may be required.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A laboratory automation system for processing sample containers containing laboratory samples, the laboratory automation system comprising:
   a sample container;
   a calibration element, wherein the calibration element is attached to the sample container, wherein the sample container is closed by a cap and wherein the cap serves as the calibration element;
   a digital camera configured to take an image of the sample container together with the calibration element, wherein the image comprises image data related to the sample container and image data related to the calibration element;
   an image processing device configured to determine pixel data of the sample container and the calibration element from the image data received from the digital camera by pattern recognition, wherein the image processing device is configured to count the number of pixels along a coordinate for the sample container and for the cap and determine geometrical properties of the sample container in along the same coordinate based on a rule of three, using the counted pixels along the same coordinate and known geometric properties of the cap; and
   a transport plane, a driver configured to move the sample container carriers on top of the transport plane, and a control device configured to control the movement of the sample container carriers on top of the transport plane by driving the driver such that the sample container carriers move along corresponding transport paths, wherein the driver is electro-magnetic actuators located below the transport plane and controllable by the control device, and the sample container carriers respectively comprise a magnetically active device for interaction with a magnetic field generated by the electro-magnetic actuators such that a magnetic drive force is applied to the sample container carriers.

2. The laboratory automation system according to claim 1, wherein the digital camera is a digital color camera, wherein the calibration element has defined color properties, wherein the image processing device is configured to calibrate the digital color camera depending on the defined color properties of the calibration element.

3. The laboratory automation system according to claim 1, further comprises,
   a pipetting station, wherein the pipetting station is configured to operate in response to the determined geometrical properties of the sample container.

4. The laboratory automation system according to claim 1, further comprises,
   a plurality of laboratory stations configured to process the samples comprised in the sample containers.

* * * * *